(12) United States Patent
Cook et al.

(10) Patent No.: US 12,474,183 B2
(45) Date of Patent: Nov. 18, 2025

(54) AT-BIT DEPTH OF CUT AND RATE OF PENETRATION MEASUREMENTS

(71) Applicant: Schlumberger Technology Corporation, Sugar Land, TX (US)

(72) Inventors: Harry Cook, Cambridge (GB); Kjell Haugvaldstad, Vanvikan (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/602,486

(22) Filed: Mar. 12, 2024

(65) Prior Publication Data

US 2025/0290774 A1   Sep. 18, 2025

(51) Int. Cl.
| | |
|---|---|
| *G01D 5/14* | (2006.01) |
| *E21B 10/42* | (2006.01) |
| *E21B 45/00* | (2006.01) |
| *E21B 47/013* | (2012.01) |
| *G01B 7/26* | (2006.01) |

(52) U.S. Cl.
CPC ............ *G01D 5/145* (2013.01); *E21B 10/42* (2013.01); *E21B 45/00* (2013.01); *E21B 47/013* (2020.05); *G01B 7/26* (2013.01)

(58) Field of Classification Search
CPC ........ E21B 10/42; E21B 45/00; E21B 47/013; G01D 5/145; G01B 7/26
See application file for complete search history.

(56) References Cited

U.S. PATENT DOCUMENTS

| | | | |
|---|---|---|---|
| 4,181,360 | A | 1/1980 | Wilson |
| 5,720,355 | A | 2/1998 | Lamine |
| 6,230,822 | B1 | 5/2001 | Sullivan |
| 6,419,032 | B1 | 7/2002 | Sullivan |
| 6,540,033 | B1 | 4/2003 | Sullivan |
| 6,543,312 | B2 | 4/2003 | Sullivan |
| 6,626,251 | B1 | 9/2003 | Sullivan |
| 7,497,276 | B2 | 3/2009 | Pastusek |
| 7,506,695 | B2 | 3/2009 | Pastusek |
| 7,510,026 | B2 | 3/2009 | Pastusek |

(Continued)

OTHER PUBLICATIONS

Dunlop, J. et al., "Increased Rate of Penetration Through Automation", SPE/IADC 139897, presented at the SPE/IADS Drilling Conference and Exhibition, Amsterdam, The Netherlands, 2021, 11 pages.

(Continued)

*Primary Examiner* — Nicole Coy
*Assistant Examiner* — Jennifer A Railey

(57) ABSTRACT

A drill bit includes cutting elements and a displacement sensor deployed on a drill bit body. The displacement sensor includes an engagement piston disposed to translate axially in a sensor housing. The engagement piston includes an inner plunger and an opposing outer engagement element configured to engage a subterranean formation and is biased outward from the sensor housing. The displacement sensor further includes a position sensor configured to sense an axial position of the engagement piston in the sensor housing. An electronic controller is configured to determine a measured displacement from the sensed axial position of the engagement piston. The displacement sensor may enable depth of cut and rate of penetration measurements to be made while drilling.

18 Claims, 6 Drawing Sheets

(56) References Cited

U.S. PATENT DOCUMENTS

| | | |
|---|---|---|
| 7,604,072 B2 | 10/2009 | Pastusek |
| 7,946,357 B2 | 5/2011 | Trinh |
| 8,162,077 B2 | 4/2012 | Glasgow |
| 8,695,729 B2 | 4/2014 | Kumar |
| 8,746,367 B2 | 6/2014 | DiGiovanni |
| 8,757,291 B2 | 6/2014 | Kumar |
| 8,807,242 B2 | 8/2014 | Cheng |
| 9,045,972 B2 | 6/2015 | Cheng |
| 9,145,741 B2 | 9/2015 | Trinh |
| 9,297,248 B2 | 3/2016 | Yao |
| 9,500,070 B2 | 11/2016 | DiGiovanni |
| 9,695,683 B2 | 7/2017 | Kumar |
| 9,739,093 B2 | 8/2017 | Trinh |
| 10,072,492 B2 | 9/2018 | DiGiovanni |
| 10,662,769 B2 | 5/2020 | Kumar |
| 11,111,731 B2 | 9/2021 | Cao |
| 11,180,989 B2 | 11/2021 | Cao |
| 11,199,082 B2 | 12/2021 | DeVries |
| 11,668,185 B2 | 6/2023 | Zhan |
| 11,732,570 B2 | 8/2023 | Sihler |
| 11,739,629 B2 | 8/2023 | Sihler |
| 11,828,164 B2 | 11/2023 | Hird |
| 11,828,165 B2 | 11/2023 | Zhan |
| 2004/0222018 A1 | 11/2004 | Sullivan |
| 2007/0221408 A1* | 9/2007 | Hall .......................... E21B 4/06 175/57 |
| 2009/0065251 A1* | 3/2009 | Hall ........................ E21B 10/62 175/45 |
| 2010/0038136 A1 | 2/2010 | Trinh |
| 2012/0255788 A1* | 10/2012 | Schwefe ................. E21B 10/42 175/408 |
| 2020/0095831 A1 | 3/2020 | Etebu |
| 2021/0189875 A1 | 6/2021 | Boualleg |
| 2021/0301641 A1* | 9/2021 | Dunbar ................... E21B 45/00 |
| 2022/0381675 A1 | 12/2022 | Haiz |
| 2023/0124575 A1 | 4/2023 | Moeny |
| 2023/0296013 A1 | 9/2023 | Lanning |
| 2024/0384646 A1 | 11/2024 | Haugvaldstad |
| 2024/0384652 A1 | 11/2024 | Haugvaldstad |
| 2024/0385346 A1 | 11/2024 | Haugvaldstad |

OTHER PUBLICATIONS

Koulidis et al., Experimental investigation of the rock cutting process and derivation of the 3D spatial distribution of the formation strength using in-cutter sensing, Journal of Petroleum Exploration and Production Technology, 2003, 16 pages.

* cited by examiner

AT-BIT DEPTH OF CUT AND RATE OF PENETRATION MEASUREMENTS

BACKGROUND

The rate of penetration (ROP) while drilling is an important metric of drilling performance. Moreover, directional drilling operations commonly rely on ROP measurements as the trajectory and final placement of a well is sensitive to how quickly the bit is advancing in relation to how much steering is being delivered. In such directional drilling operations, steering input decisions are often made based on surface ROP measurements (as well as other factors).

There is an interest in the industry to enable closed loop steering routines in which a rotary steerable tool makes steering decisions by comparing the drilling trajectory and position with a well plan or trajectory loaded directly into the tool. However, currently available downhole ROP measurements are generally not reliable or suitable for use with closed loop automated steering routines. While tools and methods for making downhole ROP measurements have been disclosed, various factors have inhibited widespread adoption. During conventional drilling operations, ROP measurements are generally made on the rig (at the surface), for example, via measuring changes in the block position with time. In general, current best practice requires driller intervention and surface ROP measurements to be down-linked to the steering tool.

Downhole ROP measurements may also offer significant benefit to logging while drilling (LWD) or measurement while drilling (MWD) imaging tools to accurately scale the images with well depth. For example, downhole ROP measurements may enable images to be scaled to a higher resolution and to be generated in real time while drilling at the LWD or MWD tool. There is a need for an improved, low cost, and reliable downhole ROP measurement as a key enabler for closed loop steering and downhole imaging tools.

SUMMARY

A displacement sensor configured for deployment in a downhole tool, such as the cutting face of a drill bit, is disclosed. The sensor includes a sensor housing and an engagement piston deployed in and disposed to translate axially in the sensor housing. The engagement piston includes an inner plunger and an opposing outer engagement element configured to engage a subterranean formation. The engagement piston is biased outward from the sensor housing. A position sensor is configured to sense an axial position of the engagement piston in the sensor housing. An electronic controller is configured to determine a measured displacement and/or a bit depth of cut from the sensed axial position of the engagement piston.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

A displacement sensor configured for deployment in a downhole tool, such as the cutting face of a drill bit, is disclosed. A disclosed drill bit may include cutting elements and the displacement sensor deployed on a drill bit body. The displacement sensor includes an engagement piston disposed to translate axially in a sensor housing. The engagement piston includes an inner plunger and an opposing outer engagement element configured to engage a subterranean formation and is biased outward from the sensor housing. The displacement sensor further includes a position sensor configured to sense an axial position of the engagement piston in the sensor housing. An electronic controller is configured to determine a measured displacement from the sensed axial position of the engagement piston. Methods of making bit depth of cut and rate of penetration measurements are also disclosed.

Figure 1:
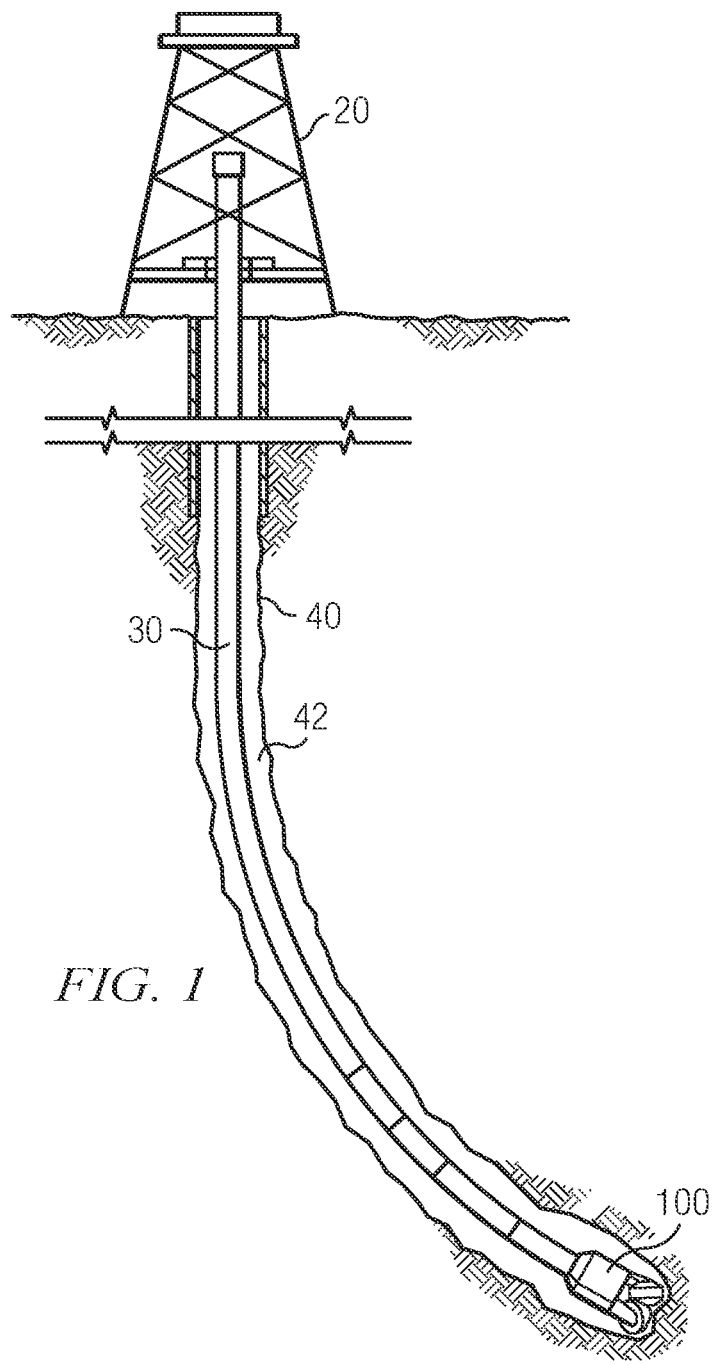
FIG. 1 depicts an example drilling rig including an instrumented drill bit.

FIG. 1 depicts an example drilling rig 20 including a disclosed instrumented drill bit 100. The drilling rig 20 may be positioned over a subterranean formation (not shown) and may be configured for drilling a geothermal well or a hydrocarbon exploration and/or production well. The rig 20 may include, for example, a derrick and a hoisting apparatus (also not shown) for raising and lowering a drill string 30, which, as shown, extends into wellbore 40 and includes a bottom hole assembly that may further include, for example, the instrumented drill bit 100, a steering tool such as a rotary steerable (RSS) tool, and a measurement tool such as one or more logging while drilling (LWD) and measurement while drilling (MWD) tools. It will be appreciated that the disclosed embodiments are not limited to any particular drill string or BHA configuration.

The instrumented drill bit 100 may be any type of drill bit suitable for degrading downhole materials and drilling the wellbore. Example types of drill bits include fixed-cutter or drag bits. In other embodiments, the drill bit 100 may include a mill for removing metal, composite, elastomer, and/or other materials, for example, for milling casing, plugs, cement, and/or other materials within the wellbore 40. As described in more detail below, the instrumented drill bit 100 includes at least one instrument assembly (not shown in FIG. 1) including a displacement sensor deployed in a cutting face of the bit. Such instrument assemblies may be configured to make and save displacement measurements to memory or may be in electronic (e.g., wireless) communication with an electronic controller deployed elsewhere in the string 30 (e.g., in an RSS, LWD, or MWD tool).

The wellbore 40 may be formed in and thereby penetrate subsurface formations by rotary drilling or slide drilling in a manner that is well-known to those of ordinary skill in the art (e.g., via well-known directional drilling techniques). For example, the drill string 30 may be rotated at the surface and/or via a downhole deployed mud motor to drill the well. A pump may deliver drilling fluid to the interior of the drill string 30 thereby causing the drilling fluid to flow downwardly through the drill string 30. The drilling fluid exits the drill string 30, e.g., via ports in the drill bit 100, and then circulates upwardly through the annulus 42 between the outside of the drill string 30 and the wall of the wellbore 40. In this known manner, the drilling fluid lubricates the drill bit 100 and carries formation cuttings uphole to the surface. MWD and LWD measurements are commonly made while drilling.

It will be further understood that the disclosed embodiments are not limited to use with an on-shore rig 20 as illustrated on FIG. 1. The disclosed embodiments are equally well suited for use with either onshore or offshore subterranean operations.

Figure 2A:
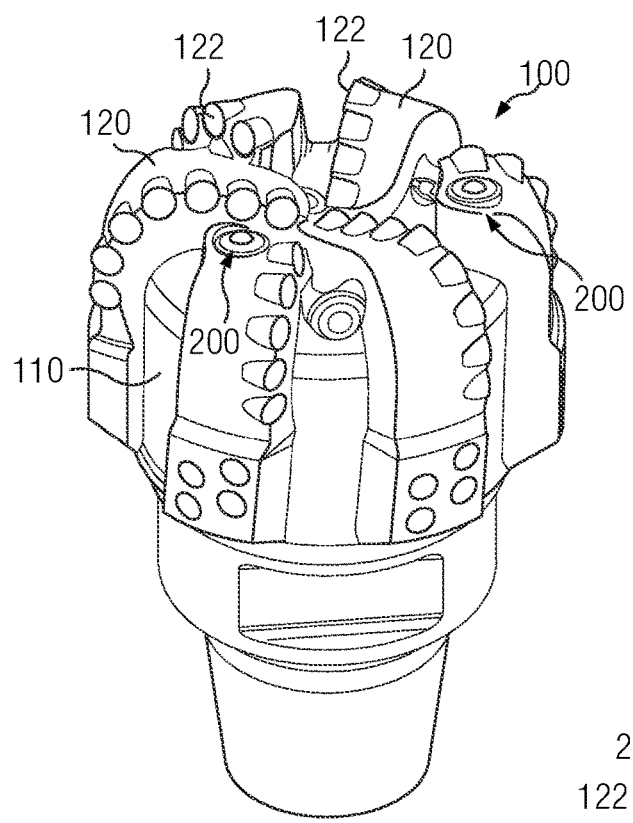
FIGS. 2A, 2B, and 2C (collectively FIG. 2) depict perspective (2A), bottom or cutting face (2B), and partial cross sectional (2C) views of one example embodiment of the instrumented drill bit shown on FIG. 1.
Figure 2B:
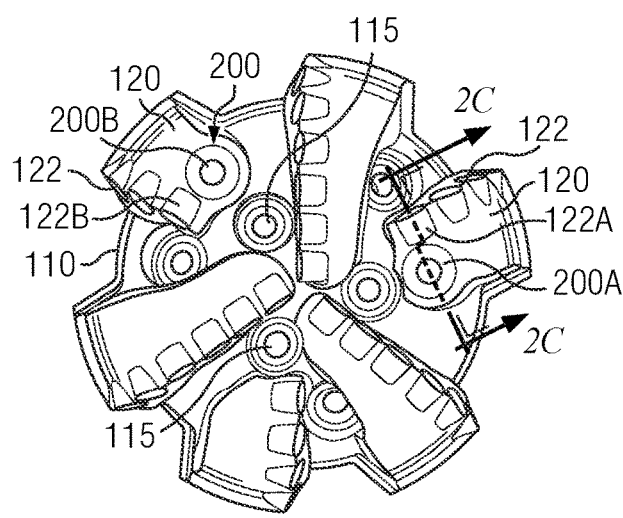

FIGS. 2A and 2B (collectively FIG. 2) depict perspective (2A), bottom or cutting face (2B), and partial cross sectional (2C) views of one example embodiment of instrumented drill bit 100. The example bit 100 may include a bit body 110 having a plurality of blades 120 that protrude therefrom. In the depicted embodiment, each of the blades may include a plurality of corresponding cutting elements 122 deployed thereon. The disclosed embodiments are not limited to any type or number of the blades 120 or cutting elements 122. The bit body 110 may further include one or more nozzles 115 (e.g., one corresponding to each of the blades 120) for providing drilling fluid to the cutting interface.

With continued reference to FIG. 2, drill bit 100 may further include at least one displacement sensor 200 (e.g., one, two, or more) deployed on one or more of the blades 120. In example embodiments, the displacement sensor 200 may be deployed at the same radial position and circumferentially behind (spaced apart from) one of the cutting elements 122 (also referred to herein as a leading cutting element). By circumferentially behind it is meant that the displacement sensor is proximate to the back side (non-cutting side) of the cutting element. The displacement sensor may be circumferentially spaced apart from the leading cutting element by about 45 degrees or less (e.g., 30 degrees or less). In such embodiments, the displacement sensor 200 is configured to measure a depth of cut of the drill bit (or of the cutting element) while drilling. Note in FIG. 2B that displacement sensor 200A is deployed at the same radial position and is circumferentially behind (or spaced apart from) leading cutting element 122A and that displacement sensor 200B is deployed at the same radial position and is circumferentially behind (or spaced apart from) leading cutting element 122B.

Figure 2C:
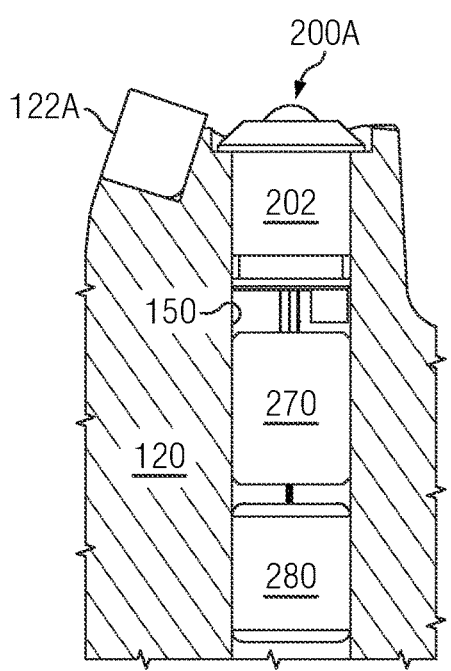

With reference to FIG. 2C, the example displacement sensor 200 may be deployed in a bore 150 in the drill bit body 110 or in the blade 120. The bore 150 may be any suitable size and shape (e.g., having any suitable diameter and depth). For example, the bore 150 may have a sufficiently large diameter and depth so as to fully house the displacement sensor 200, yet is not so large as to compromise the mechanical integrity of the bit. The depicted example displacement sensor 200 may include a displacement sensor assembly 202, an electronic controller 270 in electronic communication with the sensor assembly 202, and a battery 280 configured to power the controller 270. The controller may include, for example, one or more processors, electronic memory, and a wireless transmitter (or transceiver) configured to wirelessly communicate with other tools in the drill string (e.g., with an RSS controller deployed just above the drill bit).

While not depicted on FIG. 2, it will be understood that the displacement sensor 200 may include a seal (or seals) positioned between the sensor 200 and the bore 150 that is configured to seal the bore from the wellbore environment (e.g., to prevent fluid ingress into the bore 150 and/or the controller or battery housings). The seal may be advantageously configured to sealingly engage the bore in high pressure and temperature environments such as commonly found downhole and may include, for example, an O-ring and/or gasket seal. The disclosed embodiments are, of course, not limited to any particular sealing configuration or mechanism.

Figure 3A:
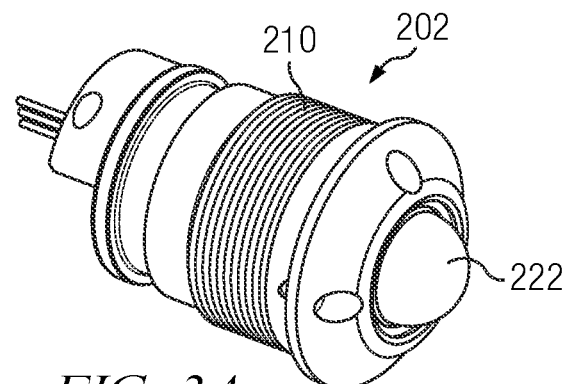
FIGS. 3A and 3B (collectively FIG. 3) depict perspective (3A) and axial cross sectional (3B) views of one example displacement sensor in the example instrumented drill bit shown on FIG. 2.
Figure 3B:
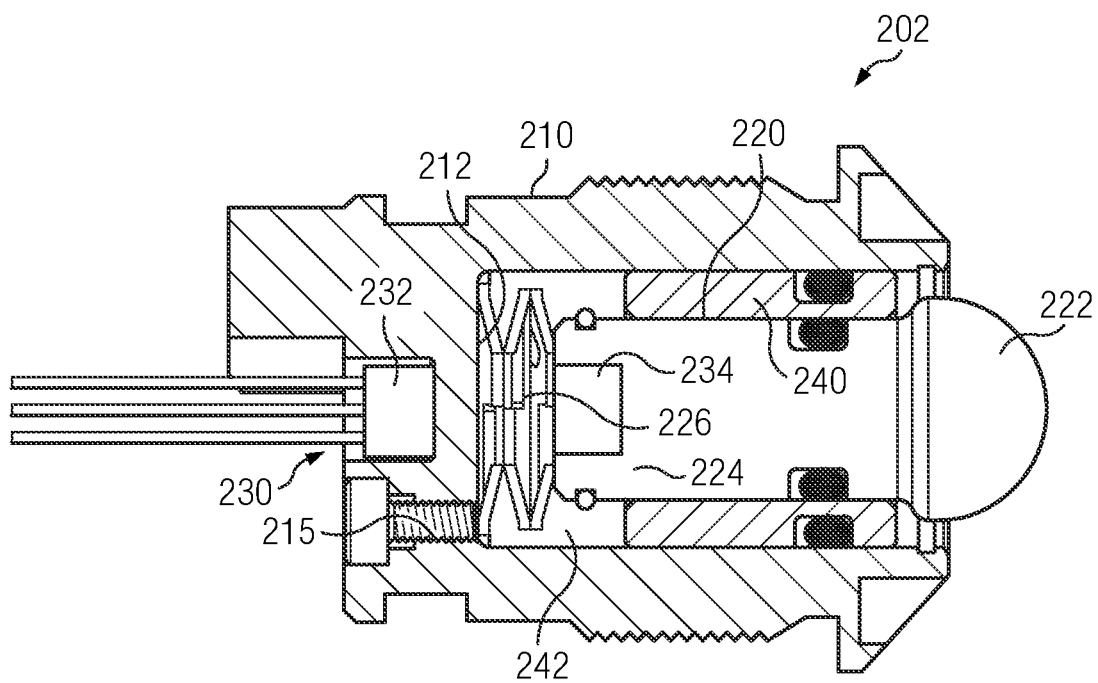

FIGS. 3A and 3B (collectively FIG. 3) depict perspective view (3A) and axial cross sectional (3B) views of one example displacement sensor assembly 202. The depicted displacement sensor assembly 202 may include a sensor housing 210 that is sized and shaped for deployment in and sealing engagement with a corresponding sensor bore formed in the drill bit blade (e.g., bore 150 as described above with respect to FIG. 2C). The displacement sensor assembly 202 may include an engagement piston 220 disposed to translate axially in the sensor housing 210. The engagement piston 220 may be biased outward from the sensor housing 210 as described in more detail below. The engagement piston 220 may include a domed or blunted engagement element 222 that is configured to engage and to slide (or ride) along the bottomhole formation behind the leading cutting element. By domed or blunted it is meant that the engagement element is not sharp or conical, but is rather dull or rounded (e.g., spherical or oval) to substantially prevent or eliminate penetration of the engagement element 222 into the formation during drilling. In example embodiments, the engagement element 222 may have an oval or approximately spherical shape, for example, having a radius of curvature greater than a radius of the engagement piston 220. Moreover, the engagement element 222 may be advantageously fabricated from a hard material having a high abrasion or wear resistance, such as tungsten carbide, polycrystalline diamond, or cubic boron nitride.

As further depicted in FIG. 3, the engagement piston 220 may be spring biased outward from the sensor housing such that the engagement element 222 contacts the formation during drilling. For example, one or more spring washers 226 may be deployed between an inner plunger 224 and an internal face 212 of the sensor housing 210. The spring washers 226 may be advantageously configured (e.g., having a spring constant) to provide a spring bias force that is sufficiently strong (large) enough to bias the engagement element 222 into contact with the formation without also significantly deforming (e.g., cutting, denting, or crushing) the formation. The spring bias force may be selected, for example, based on the hardness and/or strength of the formation, the configuration of the drill bit, and the size and shape of the engagement element 222. It will be appreciated that the disclosed embodiments are not limited to any particular spring biasing configuration.

With continued reference to FIG. 3, the engagement piston 220 may be configured to translate axially in the sensor housing 210. For example, the engagement piston 220 may translate inwards against the bias of the spring washers 226 or outwards into contact with the bottom hole under the influence of the spring bias. In the depicted example embodiment, the position of the engagement piston 220 in the sensor housing 210 may define a displacement. For example, such a displacement may be defined as an inward movement of the engagement piston 220 into the sensor housing 210 against the bias of the spring washers. The magnitude of the displacement may be measured using a position sensor 230. The position sensor 230 may include substantially any suitable sensor, for example, including a potentiometer, a linear variable differential transformer (LVDT), an optical sensor such a laser, or a contact sensor. In the depicted example embodiment, the position sensor 230 includes a hall effect sensor 232 deployed in a recess in the sensor body 210 and a permanent magnet 234 deployed in the inner plunger 224 (e.g., in the engagement piston 220). In such embodiments, the hall effect sensor 232 may be configured to sense a relative position of the permanent magnet 234 (a distance between the magnet and the hall effect sensor) and therefore sense an axial position of the engagement piston 220 in the sensor housing 210. The electronic controller 270 (FIG. 2C) may be configured to determine (e.g., compute) the displacement from the sensed axial position.

It will be appreciated that downhole hydrostatic pressure (or changes therein) may urge the engagement element 222 (and therefore the engagement piston 220) inward into the sensor body 210. Such pressure induced movement may interfere with the displacement measurements. To achieve more accurate displacement measurements, it may be advantageous to compensate for the downhole pressure (or changes in the downhole pressure) by balancing the pressure on both sides of the engagement piston 220 (e.g., by providing a pressure balance inside the sensor housing 210). The depicted example displacement sensor 200 includes an annular sliding piston compensator 240 sealed against both the sensor body 210 and the engagement plunger 224. The sealed void 242 behind (internal to) the compensator 240 may be filled with hydraulic oil via filling port 215. During downhole use, downhole pressure acting on the compensator 240 and the engagement element 222 may thereby be balanced without moving or displacing the engagement piston 220 in the sensor housing 210. The engagement element 220 may then be free to displace inwards only when acted on by a formation force (from the bottom hole). The corresponding volume change may be accommodated by a corresponding oppositely directed movement of the sliding compensator 240.

Figure 4A:
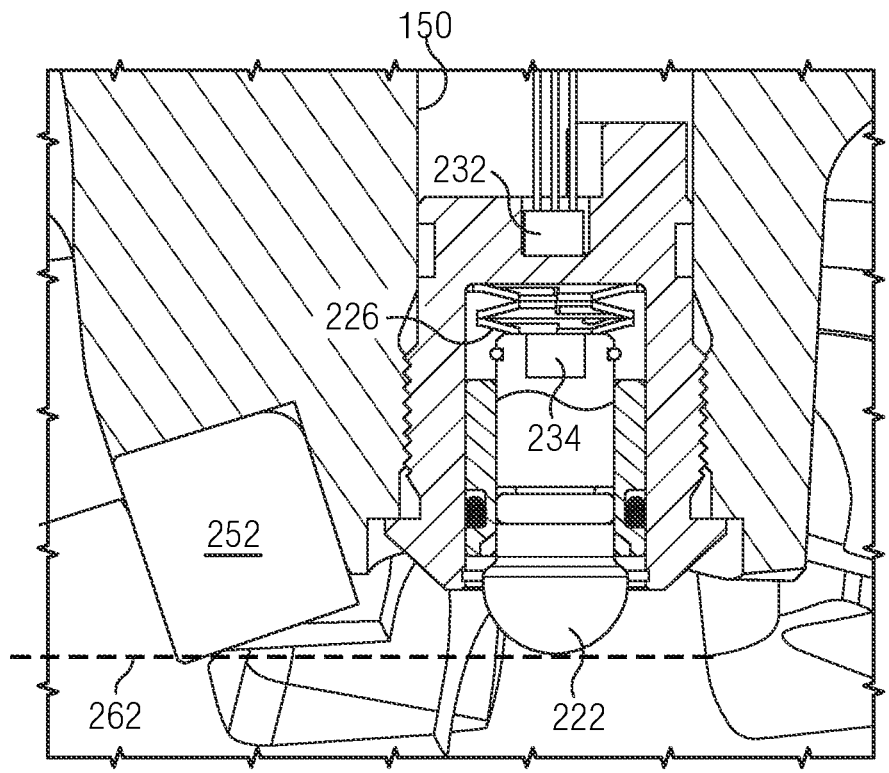
FIGS. 4A and 4B (collectively FIG. 4) depict axial cross sections through an example displacement sensor and corresponding leading cutting element for the example instrumented drill bit shown on FIG. 2.
Figure 4B:
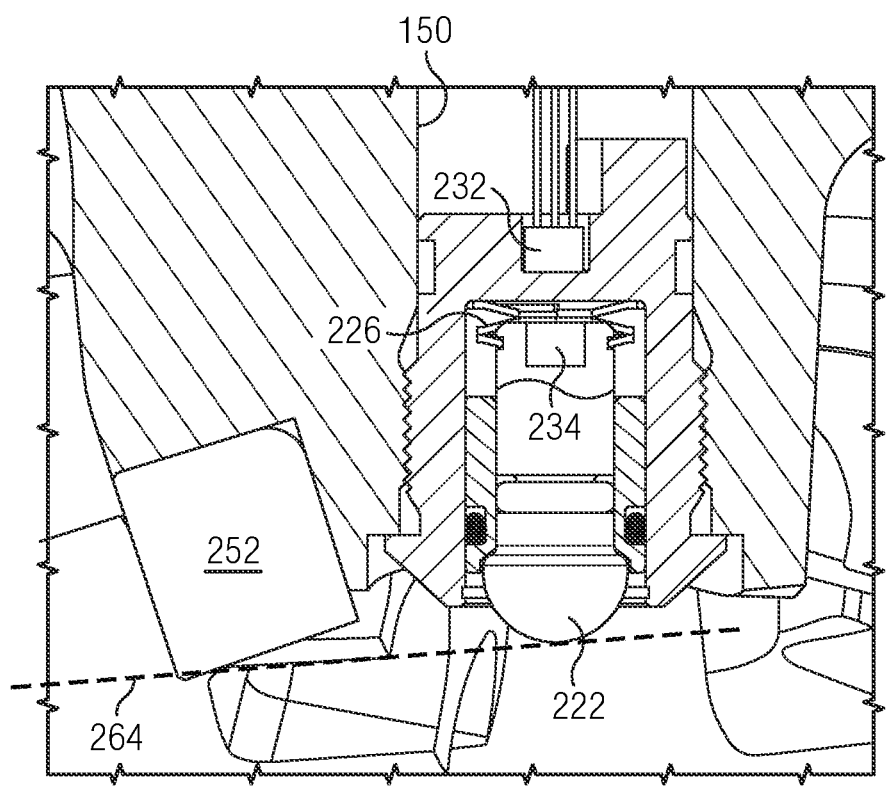

FIGS. 4A and 4B (collectively FIG. 4) depict axial cross sections of an example embodiment of drill bit 100 through the displacement sensor 200 and a corresponding leading (or proximate) cutting element 252. In FIG. 4A, the leading cutting element 252 is resting atop the bottom hole formation and has zero (or near zero) cutting depth. This may occur, for example, when there is minimal weight on bit (WOB). As depicted, the engagement element 222 extends outward into contact with the formation such that there is a relatively large distance between the magnet 234 and the hall effect sensor 232. Note also, that the gradient (or slope) between a contact point of the cutting element 252 and the circumferentially spaced engagement element 222 is essentially zero as depicted at 262.

In FIG. 4B, the leading cutting element 252 is cutting the bottomhole formation with a non-zero depth of cut. As further depicted the cutting action of the cutting element 252 results in a non-zero gradient (slope) between the contact point of the cutting element 252 and the circumferentially spaced engagement element 222 as depicted at 264. This non-zero gradient causes the engagement element 222 to be pushed inwards into the sensor housing 210 against the bias of the spring washers 226, thereby decreasing the distance between the magnet 234 and the hall effect sensor 232.

Figure 5:
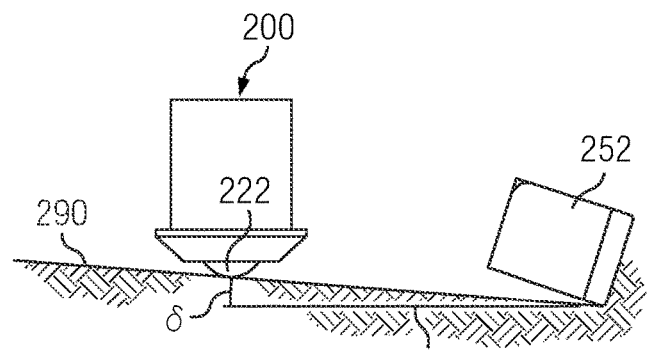
FIG. 5 depicts a schematic cross sectional view of an example leading cutting element and displacement sensor engaging a bottomhole formation.

Turning now to FIG. 5., a schematic cross sectional view of one example leading cutting element 252 and engagement element 222 engaging a bottomhole formation 290 is depicted. In the depicted schematic the cutting element 252 is engaging and cutting the formation 290 with a depth of cut that may be defined, for example, as the total axial advance of the drill bit per rotation. An individual cutting element depth of cut may also be defined as the depth of cut of a single cutting element. As depicted, the engagement element 222 is circumferentially spaced apart from cutting element 252 by a fixed circumferential offset C (e.g., measured as a distance or as an angle) and measures an axial displacement δ owing to the gradient between the contact point of the cutting element 252 and the circumferentially spaced engagement element 220. The depth of cut DOC (the total axial advance of the drill bit per rotation) may be computed from the measured axial displacement δ and the circumferential offset C, for example, as follows:

$$DOC = \frac{\delta}{C} \cdot 2\pi r \qquad (1)$$

where 2πr represents the travel distance of the leading cutting element through one full rotation (in which both the leading cutting element and the engagement element have a radial position of r on the bit).

Figure 6:
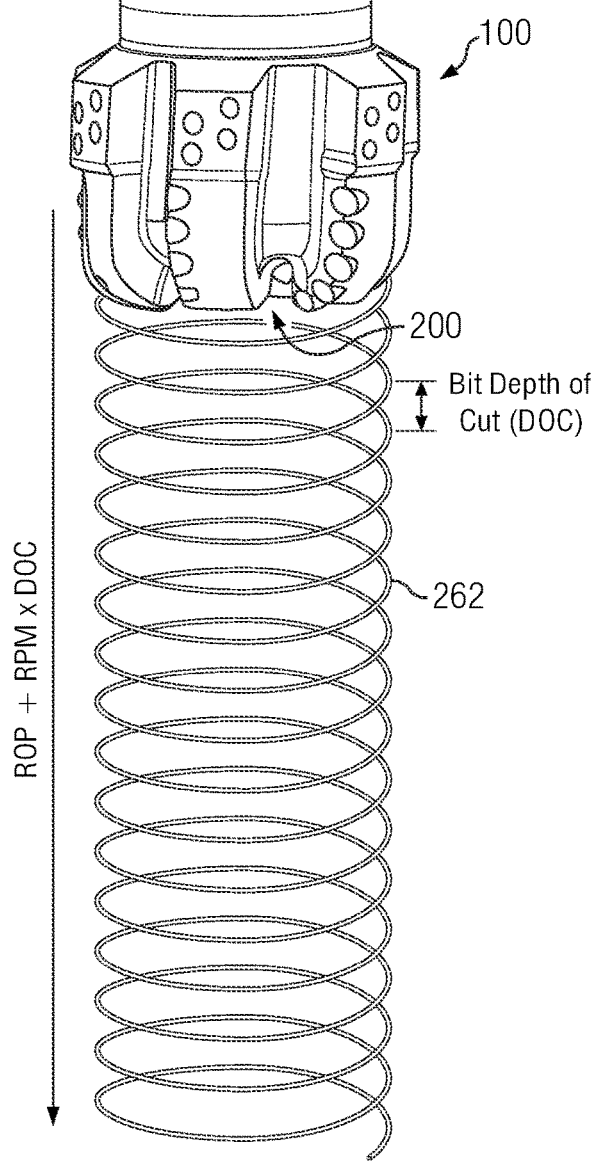
FIG. 6 depicts a side view of one example instrumented drill bit and a hypothetical trajectory of an example cutting element extending ahead of the bit.

FIG. 6 depicts a side view of one example drill bit 100 including an example displacement sensor 200. As depicted, drill bit 100 is rotated in a wellbore (not shown). FIG. 6 further depicts a hypothetical trajectory 262 of the example leading cutting element 252 (FIG. 5) as a helical path extending through the formation. The diameter of the helix is determined by the cutting element's radial position on the bit. The pitch of the helix represents the bit depth of cut (DOC) in a single revolution. It will therefore be appreciated that the rate of penetration (ROP) along the axis of the helix may be computed from the DOC and the number of rotations over a given time period, for example, rotations per minute (RPM). The rate of penetration ROP of drilling may then be computed, for example, from the measured DOC and the known rotation rate RPM of the drill bit, for example, as follows:

$$ROP = DOC \cdot RPM \qquad (2)$$

It will be appreciated that Eqs. (1) and (2) may be used to the compute the DOC and ROP at substantially any suitable time interval. Such measurements may advantageously provide substantially instantaneous DOC and ROP measurements, for example, at 1, 5, 10, 15, 30, and/or 60 second intervals. The disclosed embodiments may even be configured to provide sub-second DOC and ROP measurements.

Figure 7A:
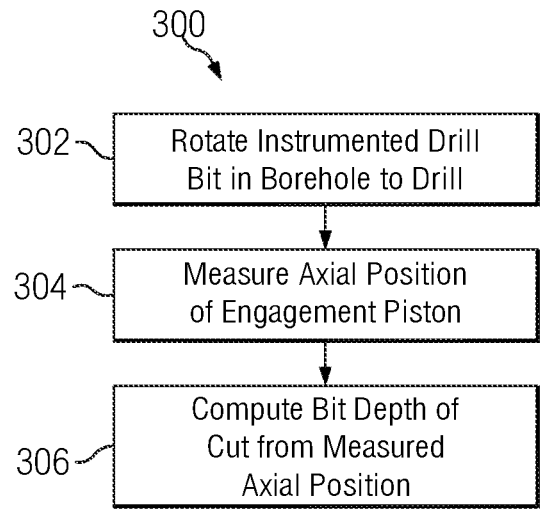
FIGS. 7A and 7B depict flow charts of example methods for measuring a depth of cut (7A) and a rate of penetration (7B) while drilling.
Figure 7B:
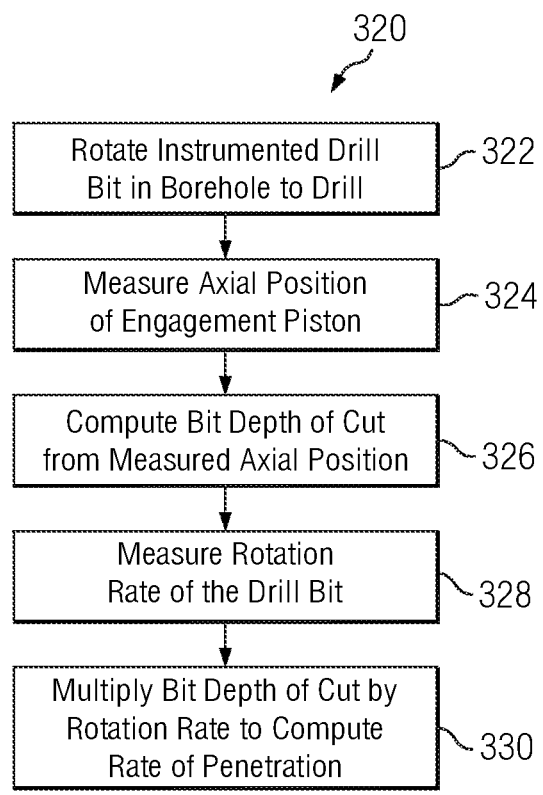

FIGS. 7A and 7B depict flow charts of example methods for measuring a depth of cut 300 (7A) and a rate of penetration 320 (7B) while drilling. In FIG. 7A, an instrumented drill bit is rotated in a borehole to drill at 302. As described above, the drill bit includes a displacement sensor deployed in a drill bit cutting face in proximity to a leading cutting element (e.g., trailing the cutting element at the same radial position on the cutting face). The axial position of an engagement piston in the displacement sensor is sensed at 304 and used to compute the drill bit depth of cut at 306. In FIG. 7B, an instrumented drill bit is rotated in a borehole to drill at 322 and the axial position of an engagement piston in the displacement sensor is sensed at 324 and used to compute the drill bit depth of cut at 326. The rotation rate of the drill bit in the borehole is measured at 328 (e.g., via magnetic field measurements made while rotating the drill bit) and multiplied by the drill bit depth of cut to compute a rate of penetration while drilling at 330.

With continued reference to FIG. 7, the DOC and/or ROP may be stored to memory and/or transmitted (e.g., wirelessly) to another controller in the drill string (e.g., in an RSS tool). Transmitted measurements may be advantageously used, for example, in closed loop directional drilling operations or in LWD imaging operations. For example, the measured ROP values and corresponding surveying measurements (e.g., inclination and azimuth) may be used to compute a three dimensional borehole profile that may be compared with a predetermined well plan. The direction of drilling may be adjusted when the actual well profile deviates from the well plan. Moreover, stored measurements may be used, for example, to correct LWD images at the surface after the drilling operation.

It will be understood that the present disclosure includes numerous embodiments. These embodiments include, but are not limited to, the following embodiments.

In a first embodiment, a drill bit comprises cutting elements deployed on a drill bit body; a displacement sensor deployed in the drill bit body proximate to one of the cutting elements, the displacement sensor including an engagement piston disposed to translate axially in a sensor housing, the engagement piston including an inner plunger and an opposing outer engagement element configured to engage a subterranean formation, the engagement piston biased outward from the sensor housing, the displacement sensor further including a position sensor configured to sense an axial position of the engagement piston in the sensor housing; and an electronic controller configured to determine a measured displacement from the sensed axial position of the engagement piston.

A second embodiment may include the first embodiment, wherein the drill bit body comprises a plurality of blades; and the proximate cutting element and the displacement sensor are deployed on one of the plurality of blades.

A third embodiment may include the second embodiment, wherein the displacement sensor is deployed at a common radial position with and circumferentially behind the proximate cutting element.

A fourth embodiment may include any one of the second through third embodiments, wherein the displacement sensor is deployed in an axial bore in the blade.

A fifth embodiment may include any one of the first through fourth embodiments, wherein the position sensor comprises a hall effect sensor deployed in the sensor housing and a permanent magnet deployed in the inner plunger.

A sixth embodiment may include any one of the first through fifth embodiments, wherein the engagement element has a radius of curvature greater than a radius of the engagement piston.

A seventh embodiment may include any one of the first through sixth embodiments, wherein the displacement sensor further comprises at least one spring washer deployed between the inner plunger and an internal face of the sensor housing to provide the outward bias of the engagement piston.

An eighth embodiment may include any one of the first through seventh embodiments, wherein the displacement sensor further comprises a piston compensator interposed between and sealed against the inner plunger and the sensor housing to define a sealed void in the sensor housing internal to the piston compensator, the piston compensator configured to translate axially with respect to both the inner plunger and the sensor housing.

A ninth embodiment may include any one of the first through eighth embodiments, wherein the position sensor comprises a hall effect sensor deployed in the sensor housing and a permanent magnet deployed in the inner plunger; the engagement element has a radius of curvature greater than a radius of the engagement piston; the displacement sensor further comprises at least one spring washer deployed between the inner plunger and an internal face of the sensor housing to provide the outward bias of the engagement piston; and the displacement sensor further comprises a piston compensator interposed between and sealed against the inner plunger and the sensor housing to define a sealed void in the sensor housing internal to the piston compensator, the piston compensator configured to translate axially with respect to both the inner plunger and the sensor housing.

A tenth embodiment may include any one of the first through ninth embodiments, wherein the controller is further configured to compute a drill bit depth of cut from the measured displacement.

In an eleventh embodiment, a method for measuring a drill bit depth of cut while drilling comprises using a drill bit to drill a borehole, the drill bit including a displacement sensor deployed in a cutting face thereof in proximity to a cutting element, the displacement sensor including an engagement piston disposed to translate axially in a sensor housing, the engagement piston including an inner plunger and an opposing outer engagement element configured to engage a subterranean formation, the engagement piston biased outward from the sensor housing, the displacement sensor further including a position sensor configured to sense an axial position of the engagement piston in the sensor housing; and computing the drill bit depth of cut from the sensed axial position of the engagement piston in the sensor housing.

A twelfth embodiment may include the eleventh embodiment, wherein the displacement sensor is deployed at a common radial position with the proximate cutting element; the displacement sensor is circumferentially spaced apart from the proximate cutting element; and the computing the drill bit depth of cut comprises determining a measured displacement from the sensed axial position, computing a ratio of the measured displacement to a circumferential spacing between the displacement sensor and the proximate cutting element, and multiplying the ratio by a travel distance of the proximate cutting element during a single rotation of the drill bit to obtain the drill bit depth of cut.

A thirteenth embodiment may include any one of the eleventh through twelfth embodiments, further comprising: measuring a rotation rate of the drill bit in the borehole; and multiplying the measured rotation rate by the computed drill bit depth of cut to determine a rate of penetration while drilling.

A fourteenth embodiment may include the thirteenth embodiment, further comprising repeating the computing, the measuring, and the multiplying while drilling at a predetermined time interval to obtain rate of penetration measurements while drilling.

A fifteenth embodiment may include any one of the eleventh through fourteenth embodiments, further comprising transmitting the computed drill bit depth of cut to another controller deployed in the borehole.

In a sixteenth embodiment, a displacement sensor configured for deployment in a downhole tool comprises: a sensor housing; an engagement piston deployed in and disposed to translate axially in the sensor housing, the engagement piston including an inner plunger and an opposing outer engagement element configured to engage a subterranean formation, the engagement piston biased outward from the sensor housing; a position sensor configured to sense an axial position of the engagement piston in the sensor housing; and an electronic controller configured to determine a measured displacement from the sensed axial position of the engagement piston.

A seventeenth embodiment may include the sixteenth embodiment, wherein the position sensor comprises a hall effect sensor deployed in the sensor housing and a permanent magnet deployed in the inner plunger.

An eighteenth embodiment may include any one of the sixteenth through seventeenth embodiments, wherein the displacement sensor further comprises at least one spring washer deployed between the inner plunger and an internal face of the sensor housing to provide the outward bias of the engagement piston.

A nineteenth embodiment may include any one of the sixteenth through eighteenth embodiments, further comprising a piston compensator interposed between and sealed against the inner plunger and the sensor housing to define a sealed void in the sensor housing internal to the piston compensator, the piston compensator configured to translate axially with respect to both the inner plunger and the sensor housing.

A twentieth embodiment may include any one of the sixteenth through nineteenth embodiments, wherein the electronic controller is further configured to compute a drill bit depth of cut from the measured displacement.

Although at-bit depth of cut and rate of penetration measurements have been described in detail, it should be understood that various changes, substitutions and alternations can be made herein without departing from the spirit and scope of the disclosure as defined by the appended claims.

What is claimed is:

1. A drilling tool comprising:
a drill bit body having a plurality of blades, cutting elements, and a displacement sensor disposed proximate to one of the cutting elements, wherein the proximate cutting element and the displacement sensor are disposed on one of the plurality of blades, wherein the displacement sensor includes an engagement piston configured to translate axially in a sensor housing, wherein the engagement piston includes an inner plunger and an opposed outer engagement element configured to engage a subterranean formation, wherein the engagement piston is biased outward from the sensor housing, wherein the displacement sensor configured to sense an axial position of the engagement piston in the sensor housing; and
an electronic controller operably coupled to the displacement sensor and configured to determine a measured displacement from the sensed axial position of the engagement piston.

2. The drilling tool of claim 1, wherein the displacement sensor is disposed at a common radial position and circumferentially behind the proximate cutting element.

3. The drilling tool of claim 1, wherein the displacement sensor is disposed in an axial bore in the blade.

4. The drilling tool of claim 1, wherein the displacement position sensor comprises a hall effect sensor disposed in the sensor housing and a permanent magnet disposed in the inner plunger.

5. The drilling tool of claim 1, wherein the engagement element has a radius of curvature greater than a radius of the engagement piston.

6. The drilling tool of claim 1, wherein the displacement sensor further comprises at least one spring washer disposed between the inner plunger and an internal face of the sensor housing to provide the outward bias of the engagement piston.

7. The drilling tool of claim 1, wherein the displacement sensor further comprises a piston compensator interposed between and sealed against the inner plunger and the sensor housing to define a sealed void in the sensor housing internal to the piston compensator, the piston compensator configured to translate axially with respect to both the inner plunger and the sensor housing.

8. The drilling tool of claim 1, wherein:
the displacement sensor comprises a hall effect sensor disposed in the sensor housing and a permanent magnet disposed in the inner plunger;
the engagement element has a radius of curvature greater than a radius of the engagement piston;
the displacement sensor further comprises at least one spring washer disposed between the inner plunger and an internal face of the sensor housing to provide the outward bias of the engagement piston; and
the displacement sensor further comprises a piston compensator interposed between and sealed against the inner plunger and the sensor housing to define a sealed void in the sensor housing internal to the piston compensator, the piston compensator configured to translate axially with respect to both the inner plunger and the sensor housing.

9. The drilling tool of claim 1, wherein the electronic controller is further configured to compute a drill bit depth of cut from the measured displacement.

10. A method for measuring a drill bit depth of cut while drilling, the method comprising:
using a drill bit to drill a borehole, the drill bit including a drill bit body having a plurality of blades, cutting elements, and a displacement sensor disposed proximate to one of the cutting elements, wherein the proximate cutting element and the displacement sensor are disposed on one of the plurality of blades, wherein the displacement sensor includes an engagement piston disposed to translate axially in a sensor housing, wherein the engagement piston includes an inner plunger and an opposed outer engagement element configured to engage a subterranean formation, wherein the engagement piston is biased outward from the sensor housing, and wherein the displacement sensor is further configured to sense an axial position of the engagement piston in the sensor housing; and
computing the drill bit depth of cut from the sensed axial position of the engagement piston in the sensor housing.

11. The method of claim 10, wherein
the displacement sensor is disposed at a common radial position with the proximate cutting element;

the displacement sensor is circumferentially spaced apart from the proximate cutting element; and the computing the drill bit depth of cut comprises determining a measured displacement from the sensed axial position, computing a ratio of the measured displacement to a circumferential spacing between the displacement sensor and the proximate cutting element, and multiplying the ratio by a travel distance of the proximate cutting element during a single rotation of the drill bit to obtain the drill bit depth of cut.

12. The method of claim 10, further comprising:

measuring a rotation rate of the drill bit in the borehole using magnetic field measurements while rotating the drill bit; and multiplying the measured rotation rate by the computed drill bit depth of cut to determine a rate of penetration while drilling.

13. The method of claim 12, further comprising repeating the computing, the measuring, and the multiplying while drilling at a predetermined time interval to obtain rate of penetration measurements while drilling.

14. The method of claim 10, further comprising transmitting the computed drill bit depth of cut to another electronic controller disposed in the borehole.

15. A displacement sensor configured for deployment in a downhole tool, the displacement sensor comprising:

a sensor housing;

an engagement piston disposed in the sensor housing and configured to translate axially in the sensor housing, the engagement piston including an inner plunger and an opposing outer engagement element configured to engage a subterranean formation, the engagement piston biased outward from the sensor housing;

a piston compensator interposed between and sealed against the inner plunger and the sensor housing to define a sealed void in the sensor housing internal to the piston compensator, the piston compensator configured to translate axially with respect to both the inner plunger and the sensor housing;

a position sensor configured to sense an axial position of the engagement piston in the sensor housing; and an electronic controller configured to determine a measured displacement from the sensed axial position of the engagement piston.

16. The displacement sensor of claim 15, wherein the position sensor comprises a hall effect sensor disposed in the sensor housing and a permanent magnet disposed in the inner plunger.

17. The displacement sensor of claim 15, wherein the displacement sensor further comprises at least one spring washer disposed between the inner plunger and an internal face of the sensor housing to provide the outward bias of the engagement piston.

18. The displacement sensor of claim 15, wherein the electronic controller is further configured to compute a drill bit depth of cut from the measured displacement.

* * * * *